(12) United States Patent  
Ahmad et al.

(10) Patent No.: US 8,832,390 B1  
(45) Date of Patent: Sep. 9, 2014

(54) ONLINE CLASSIFICATION OF MEMORY PAGES BASED ON ACTIVITY LEVEL USING DYNAMICALLY ADJUSTABLE SCAN RATES

(75) Inventors: Irfan Ahmad, Mountain View, CA (US); Kiran Tati, Santa Clara, CA (US); Pin Lu, Bellevue, WA (US)

(73) Assignee: VMware, Inc., Palo Alto, CA (US)

( * ) Notice: Subject to any disclaimer, the term of this patent is extended or adjusted under 35 U.S.C. 154(b) by 691 days.

(21) Appl. No.: 12/834,669

(22) Filed: Jul. 12, 2010

(51) Int. Cl.  
*G06F 12/00* (2006.01)  
*G06F 9/455* (2006.01)

(52) U.S. Cl.  
USPC .................. 711/154; 711/E12.002; 718/1

(58) Field of Classification Search  
USPC .............................. 711/154; 718/1  
See application file for complete search history.

(56) References Cited

U.S. PATENT DOCUMENTS

| | | | |
|---|---|---|---|
| 6,035,377 A * | 3/2000 | James et al. ................ | 711/147 |
| 7,809,904 B1 | 10/2010 | Wilt | |
| 2003/0217246 A1 | 11/2003 | Kubota et al. | |
| 2004/0078518 A1 | 4/2004 | Kuwata | |
| 2005/0232192 A1 | 10/2005 | Rawson | |
| 2006/0117160 A1 | 6/2006 | Jackson et al. | |
| 2006/0200546 A9 | 9/2006 | Bailey et al. | |
| 2007/0011421 A1 * | 1/2007 | Keller et al. .................. | 711/165 |
| 2007/0288783 A1 | 12/2007 | Ogasawara et al. | |
| 2008/0034234 A1 | 2/2008 | Shimizu et al. | |
| 2008/0201542 A1 * | 8/2008 | Maruyama et al. ........... | 711/165 |
| 2008/0320203 A1 | 12/2008 | Fitzgerald | |
| 2009/0064136 A1 * | 3/2009 | Dow et al. ......................... | 718/1 |
| 2009/0182976 A1 | 7/2009 | Agesen | |
| 2009/0240899 A1 * | 9/2009 | Akagawa et al. ............. | 711/154 |
| 2010/0058086 A1 | 3/2010 | Lee | |
| 2010/0191922 A1 * | 7/2010 | Dickey et al. ................. | 711/154 |
| 2011/0154104 A1 | 6/2011 | Swanson et al. | |
| 2011/0271070 A1 * | 11/2011 | Worthington et al. ........ | 711/165 |
| 2012/0011504 A1 | 1/2012 | Ahmad et al. | |

OTHER PUBLICATIONS

U.S. Appl. No. 12/683,273, filed Jan. 6, 2010, titled "Method and System for Frequent Checkpointing.".  
U.S. Appl. No. 13/179,032, filed Jul. 8, 2011 in the name of Ahmad.  
U.S. Appl. No. 12/834,677, filed Jul. 12, 2010 in the name of Tati et al.

* cited by examiner

Primary Examiner — Aracelis Ruiz (57) ABSTRACT

Activity level of memory pages is repeatedly classified in a virtual machine environment, so that live VM migration can be carried out more efficiently. The time intervals upon which the activity level of the memory pages are repeatedly classified can be dynamically adjusted to better align its performance with the live VM migration process.

20 Claims, 7 Drawing Sheets

Finite State Machine 500

ONLINE CLASSIFICATION OF MEMORY PAGES BASED ON ACTIVITY LEVEL USING DYNAMICALLY ADJUSTABLE SCAN RATES

BACKGROUND

Managing memory resources is an important function of computer system software. A conventional operating system, for example, manages virtual memory to physical memory page mappings through a level of virtual to physical indirection. The virtual memory to physical memory mapping is transparent to an application referencing memory via a virtual address. This indirection enables the operating system to utilize one or more virtual memory address spaces that together are larger than physical memory and store recently accessed pages within physical memory for efficient access and to swap out pages (e.g., between memory and storage, etc.) that are less recently accessed.

In virtual machine environments, in which virtual machines (VMs) employ guest operating systems to provide guest virtual memory to guest physical memory mappings, a hypervisor provides a second level of indirection to provide guest physical memory to machine memory mappings. Because the hypervisor manages guest physical memory to machine memory page mappings, it is able to identify and isolate the guest physical memory of specified VMs within the machine memory and "migrate" memory pages of a VM from a source machine to a destination machine making possible a variety of hypervisor-based services to assist IT administrators in managing VM-based data centers. For example, entire VM states (e.g., memory space and processor state) can be migrated in real time (referred to as "live migration") from one server to another server for dynamic load balancing across hosts and other management operations, or to create backup VMs on separate hosts, which serve as replicas of the primary VM, and are used for fault tolerance (FT).

In each of these examples, memory pages are being transmitted from a source machine to a destination machine. As the process is being carried out, the same memory page, however, may be transmitted more than once, e.g., if a memory page that has been transmitted is modified at the source machine before the process completes. Retransmitting memory pages wastes time, adds computational overhead, and unnecessarily consumes network bandwidth. Therefore, what is needed in the art is a technique for carrying out hypervisor-based services in a more time and resource efficient manner.

SUMMARY

One or more embodiments of the present invention provide methods of migrating a VM from a source destination to a destination machine based on the activity level of the VM's memory pages, so that the migration can be carried out more efficiently.

A method for migrating memory pages of a virtual machine from a source machine to a destination machine, according to an embodiment of present invention, comprises the steps of repeatedly classifying an activity level of each memory page of the virtual machine during execution of the virtual machine, identifying a first set of memory pages to be transmitted to the destination machine based on the classified activity level of the memory pages of the virtual machine, transmitting the first set of memory pages to the destination machine while the virtual machine is executing, and analyzing a remaining set of memory pages for additional memory pages to be transmitted to the destination machine.

This method, according to another embodiment, may comprise the steps of estimating a time interval for transmitting the first set of memory pages to the destination machine, and adjusting the rate at which the activity level of each memory page of the virtual machine during execution of the virtual machine is repeatedly classified.

DETAILED DESCRIPTION

Figure 1:
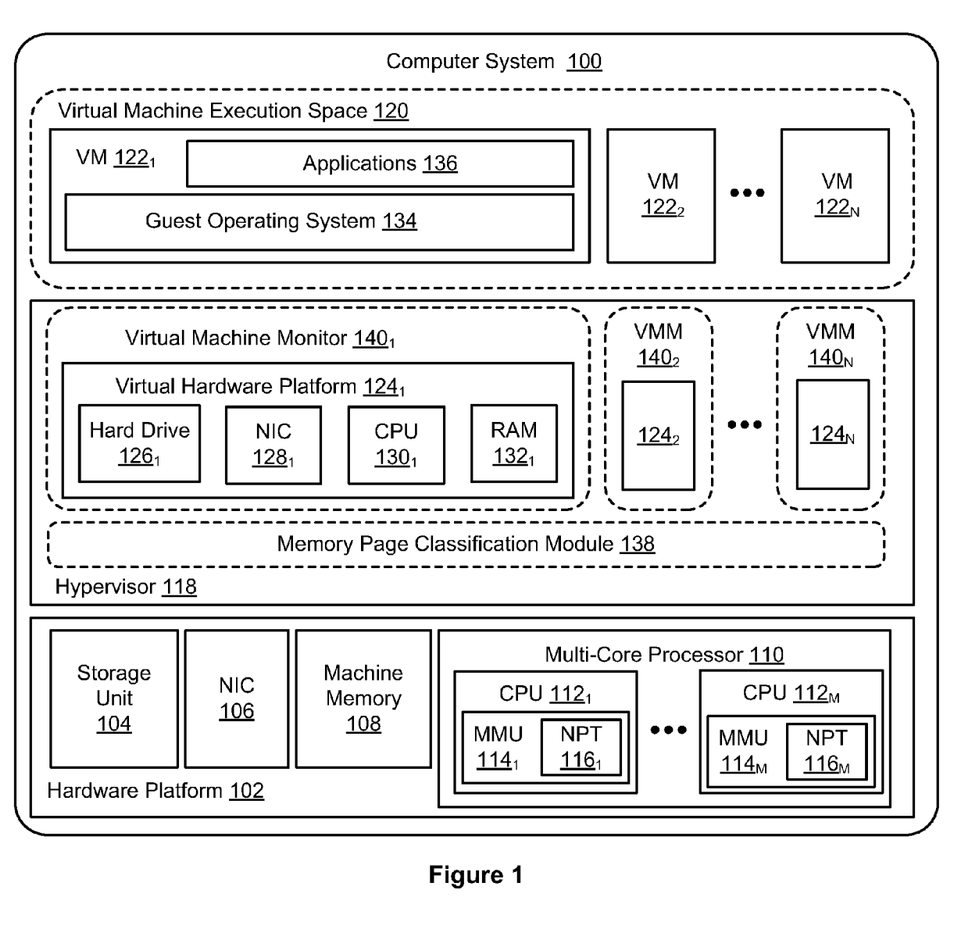
FIG. 1 is a block diagram illustrating a computer system configured to implement one or more aspects of the present invention.

FIG. 1 is a block diagram illustrating a computer system configured to implement one or more aspects of the present invention. Host computer system 100 may be constructed on a desktop, laptop or server grade hardware platform 102 such as an x86 architecture platform. Such a hardware platform may include a local storage unit 104, such as at least one hard drive, at least one network adapter (NIC 106), machine memory 108, one or more multi-core processors 110 (only one of which is illustrated in FIG. 1) and other I/O devices such as, for example and without limitation, a mouse and keyboard (not shown in FIG. 1). Multi-core processor 110 provides multiple CPUs $112_1$ to $112_M$ which operate concurrently and can read and write to any portion of machine memory 108. Each of CPUs $112_1$ to $112_M$ includes a memory management unit (MMU) 114 with a support module 116 for nested page tables (NPT), which implement a technique also known as rapid virtualization indexing (RVI) or extended page tables (EPT). One of the functions of support module 116 is traversing the NPT to translate received virtual physical addresses of a VM's guest operating system into the actual corresponding machine addresses of machine memory 108. This feature inside support module 116 is referred to herein as the "hardware NPT walker." Examples of a multi-core processor 110 that supports such nested page table structures include AMD's Opteron™ family of multi-core processors and Intel's Nehalem processors with EPT, which is the term Intel uses in lieu of nested page tables.

A virtualization software layer, also referred to hereinafter as hypervisor 118, is installed on top of hardware platform 102. Hypervisor 118 supports virtual machine execution space 120 within which multiple VMs may be concurrently instantiated and executed. As shown, virtual execution space 120 includes VMs $122_1$-$122_N$. For each of VMs $122_1$-$122_N$, hypervisor 118 manages a corresponding virtual hardware platform (i.e., virtual hardware platforms $124_1$-$124_N$) that includes emulated hardware such as at least one virtual hard drive $126_1$, at least one virtual NIC $128_1$, one or more virtual CPUs $130_1$ (only one of which is illustrated in FIG. 1) and RAM $132_1$ for VM $122_1$. For example, virtual hardware platform $124_1$ may function as an equivalent of a standard x86 hardware architecture such that any x86 supported operating system, e.g., Microsoft Windows®, Linux®, Solaris® x86, Novell NetWare®, FreeBSD, etc., may be installed as guest operating system 134 to execute any supported application in application layer 136 for user VM $122_1$. Guest operating system 134 of VM $122_1$ includes device drivers (e.g., pre-existing device drivers available for guest operating system 134 etc.) that interact with emulated devices in virtual hardware platform $124_1$ as if such emulated devices were actual physical devices. Hypervisor 118 is responsible for transforming requests from device drivers in guest operating system 134 that are received by emulated devices in virtual platform $124_1$, into corresponding requests to corresponding physical devices in hardware platform 102. Hypervisor 118 further comprises a memory page classification module 138 that, as further described below, classifies memory pages of a VM based on the states of a finite state machine (FSM).

It should be recognized that alternative computer systems may be configured to implement one or more aspects of the present invention, including, for example, computer systems with one or more single-core hardware processors. Similarly, computer systems without hardware support for nested page tables may be configured to implement one or more aspects of the present invention. For example, one such computer system may comprise a hypervisor 118 that manages shadow page tables in a software based MMU that maps guest virtual memory pages directly to machine memory pages in machine memory 108. It should further be recognized that the various terms, layers and categorizations used to describe the virtualization components in FIG. 1 may be referred to differently without departing from their functionality or the spirit or scope of the invention. For example, virtual hardware platforms $124_1$-$124_N$ may be considered to be part of virtual machine monitors (VMM) $140_1$-$140_N$ which implement the virtual system support needed to coordinate operations between hypervisor 118 and their respective VMs. Alternatively, virtual hardware platforms $124_1$-$124_N$ may also be considered to be separate from VMMs $140_1$-$140_N$, and VMMs $140_1$-$140_N$ may be considered to be separate from hypervisor 118. Similarly, in alternative embodiments, memory page classification module 138 of hypervisor 118 may comprise or be considered to be separate logical modules within each of VMMs $140_1$-$140_N$ that each serves corresponding VM $122_1$-$122_N$. One example of hypervisor 118 that may be used in accordance with the teachings herein is included as a component of VMware's ESX™ product, which is commercially available from VMware, Inc. of Palo Alto, Calif. It should further be recognized that other general purpose operating systems and virtualized computer system architectures may be used consistent with the teachings herein, such as hosted virtual machine systems, where the hypervisor is designed to run on top of a host operating system, or a shared storage array network (SAN) that is shared among various virtualized computer systems (e.g., clusters) in order to store virtual hard drives such as hard drive $126_1$. It should also be recognized that the techniques taught herein could be efficiently implemented directly in hardware, such as to augment the function of a processing unit. For example, a processor such as an x86 or SPARC processor could implement heat classification via microcode or via one or more specialize hardware modules. Furthermore, a processor support chip, such as a memory interface chip, could implement page heat classification directly.

In computer system 100, in which VMs 122 employ guest operating systems 134 to provide guest virtual memory to guest physical memory mappings, hypervisor 118 provides guest physical memory to machine memory mappings. The guest virtual memory space is mapped to the guest physical memory space using guest page tables and the guest physical memory space is mapped to the machine memory space using nested page tables that are managed by hypervisor 118. In some embodiments, the guest virtual memory space may be mapped directly to the machine memory space using shadow page tables that are managed by hypervisor 118.

Figure 2:
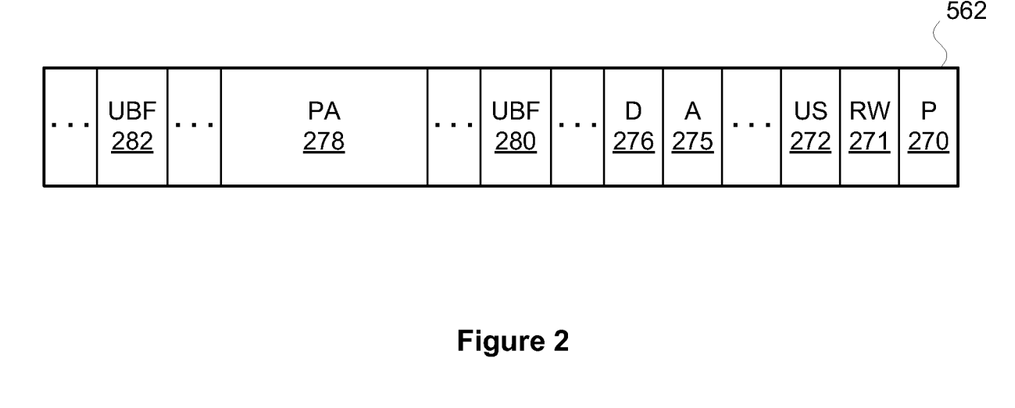
FIG. 2 illustrates different bit fields within a page table entry containing information that is used in deriving the activity level of a memory page.

FIG. 2 illustrates different bit fields within a page table entry 262 of a nested page table. The bit fields include a present bit P 270, a read/write permission bit RW 271, a user/supervisor state bit US 272, an accessed bit A 275, a dirty bit D 276, a physical address PA 278, and at least one unused bit field UBF 280, 282. Additional data may also be represented in each PTE 262. The present bit P 270 indicates that a corresponding page is present in machine memory. The present bit P 270 must be equal to "1" for a valid mapping. The read/write permission bit RW 271 indicates whether the corresponding page may be written or read only. The user/supervisor bit US 272 indicates whether the page may be accessed by a user level process or if only a supervisor level process may access the page. When data is written to or read from machine memory 108, the accessed bit A 275 is set (assigned a value of "1"), and if the instruction was a write instruction, the dirty bit D 276 is also set, indicating that the memory page has been written to (the accessed and dirty bits are collectively referred to herein as "A/D" bits). Once set, the A/D bits remain set until cleared. In conventional x86 systems, the accessed bit A 275 and dirty bit D 276 may be set by hardware in response to a corresponding action, however only software may clear each bit. It should be understood that "set" being represented as a value of "1" and "cleared" being represented as a value of "0" is arbitrary and any other technically feasible representation may be used. The physical address PA 278 is a pointer to a 4K-aligned page. The twelve remaining least significant virtual address bits select a byte within the 4K-aligned page.

In the example of a computer system that utilizes shadow page tables, which map guest virtual memory pages directly to machine memory pages, the hypervisor cannot determine directly from the shadow page tables whether or not a guest physical page has been accessed or dirtied. In order to obtain A/D information of a guest physical page, the hypervisor first obtains all of the guest virtual pages that are mapped to the guest physical page using a backmap maintained by the corresponding VMM and examines the page table entries of these guest virtual pages in the shadow page tables. If the accessed A bit of any of these page table entries is set, the hypervisor determines the accessed A bit of the guest physical page to be set. If the dirty D bit of any of these page table entries is set, the hypervisor determines the dirty D bit of the guest physical page to be set.

The setting of A/D bits in page table entries by the hardware processor during execution of a VM provides a basis for classifying the activity level of memory pages corresponding to such page table entries. For example, more frequently and/or recently accessed memory pages may be classified as "hotter" pages that are more likely to be accessed in the near future while memory pages that have not been frequently and/or recently accessed may be classified as "colder" web pages that are less likely to be accessed in the near future. Various hypervisor-based services may be provided or optimized by utilizing such a heat classification system for memory pages. For example, live migration of a VM from a source machine to a destination machine can be optimized by only migrating "cold" classified memory pages prior to stunning the VM (i.e., in order to reduce the need to re-transmit memory pages that have been modified after transmission once the VM is stunned).

Figure 3:
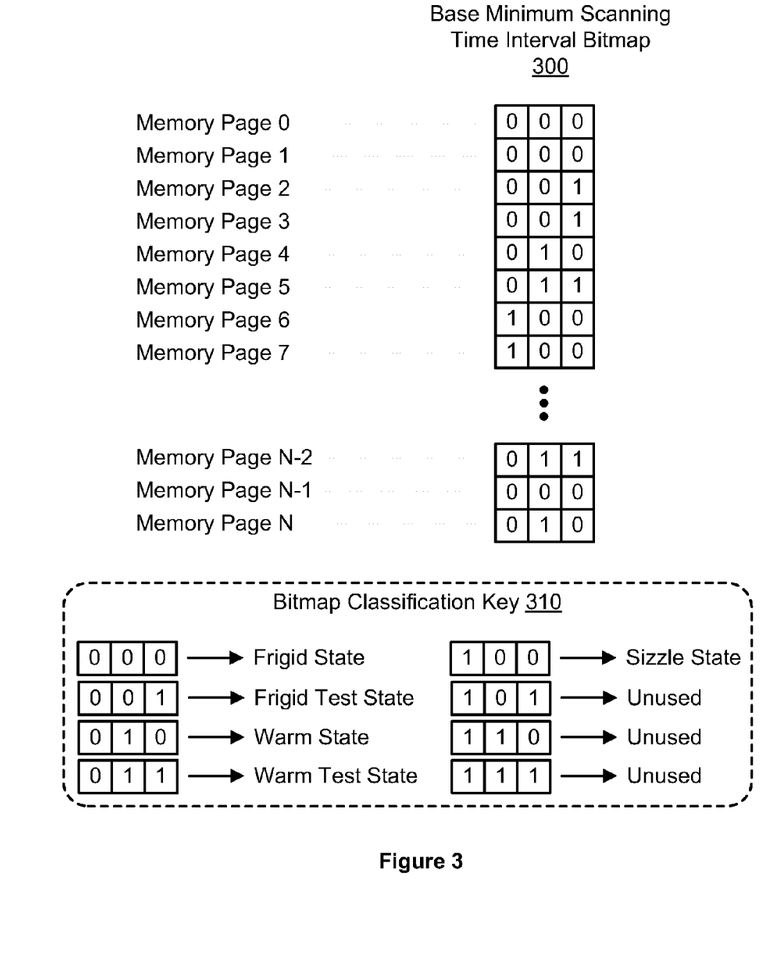
FIG. 3 depicts a data structure for maintaining a heat classification state for each memory page of a VM.

FIG. 3 depicts a data structure for maintaining a heat classification state for each memory page of a VM. In the embodiment of FIG. 3, the memory page classification module 138 of hypervisor 118 maintains a bitmap 300 to store a heat classification state for each memory page upon elapse of a specified scanning time interval during execution of the VM. For example, bitmap 300 may correspond to a specified scanning time interval of 1 second such that heat classification states for memory pages are updated by memory page classification module 138 every 1 second. As depicted, each set of 3 consecutive bits in bitmap 300 corresponds to a memory page of the VM (e.g., memory pages 0 to N, as depicted in the embodiment of FIG. 3, comprise all the memory pages of the VM) and represents one of 5 heat classification states, as indicated by bitmap classification key 310: (1) frigid state, (2) warm test state (3) warm state, (4) sizzle test state, and (5) frigid test state. It should be recognized that the heat classification states of bitmap classification key 310 are merely exemplary and that any number of different heat classification states and names may be utilized in alternative embodiments. It should further be recognized that alternative embodiments may implement different data structures or otherwise track memory page heat classification states in a different manner. For example, in one alternative embodiment, heat classification states for the base minimum scanning time interval may be stored in 3 unused bits of the page table entry for the memory page itself. This implementation is described in U.S. patent application Ser. No. 12/834,677 entitled "Page Table Data Structure for Supporting Online Classification of Memory Pages Based on Activity Level," filed concurrently with this application, which is incorporated by reference herein. In another alternative embodiment, rather than storing the heat classification as bits, for each of the supported scanning time intervals, the hypervisor maintains 5 separate linked lists that each comprise nodes representing memory pages belonging to one of the 5 heat classification states. In such an embodiment, when heat classification states are changed for a memory page, its corresponding node is removed from one linked list and added to another. Such a linked list embodiment may additionally provide easier access for hypervisor-based services that need to identify memory pages having a certain state (since such memory pages are grouped into the same linked list). This implementation is described in U.S. patent application Ser. No. 12/834,662 entitled "Online Classification of Memory Pages Based on Activity Level," filed concurrently with this application, which is incorporated by reference herein.

Figure 4:
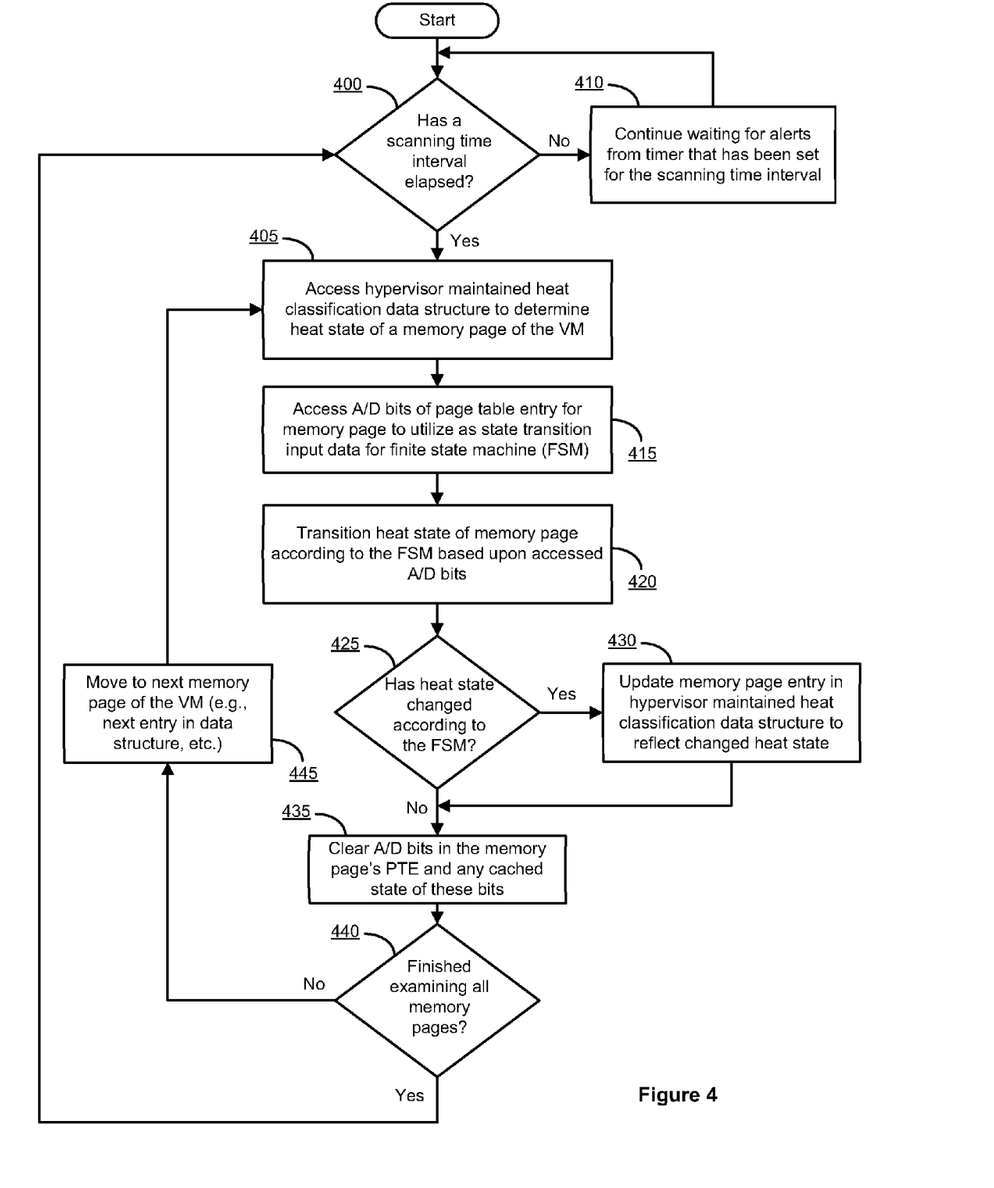
FIG. 4 is a flow diagram for classifying memory pages of a VM into a plurality of states in accordance with a finite state machine for a specified scan rate.

FIG. 4 is a flow diagram for classifying memory pages of a VM into a plurality of states in accordance with a finite state machine for a specified scan rate (also referred to herein as "scanning frequency"). In step 400, memory page classification module 138 of hypervisor 118 determines whether the specified scanning time interval has elapsed. If the scanning time interval has elapsed, then in step 405, memory page classification module 138 accesses the heat classification data structure (e.g., bitmap 300) to determine the heat state of a first memory page of the VM (e.g., memory page 0 in FIG. 3). If the scanning time interval has not elapsed, then in step 410, memory page classification module 138 continues to wait for alerts from a timer that has been set for the scanning time interval. In step 415, memory page classification module 138 accesses the A/D bits in the page table entry for the memory page to serve as state transition input data for a finite state machine that determine whether there is a change in heat state. In step 420, memory page classification module 138 "transitions" the heat state of the memory page according to the FSM based upon the accessed A/D bits. In step 425, if the FSM indicates that the heat state of the memory page should be changed, then in step 430, memory page classification module 138 updates the memory page entry in the heat classification data structure (e.g., see FIG. 3) to reflect the changed heat state. In step 435, memory page classification module 138 clears the A/D bits in the memory page's page table entry. Also, any cached state of these bits, e.g., in a translation look-aside buffer (TLB), is also flushed. If there are remaining memory pages in the VM left to update as assessed in step 440, then, in step 445, memory page classification module 138 moves to a next memory page of the VM and then returns to step 405. It should be recognized that determining the next memory page of the VM in step 445 may be implemented in a variety of ways, depending, for example, upon the data structure utilized to maintain heat state in the embodiment. For example, if a data structure similar to the bitmap in FIG. 3 is used in an embodiment, determining the next memory page may comprise moving to the next sequentially numbered memory page in the VM's memory space. Alternatively, if separate linked list data structures are utilized to group memory pages of the same heat state together, then determining the next memory page may comprise moving to the next node in a linked list (or a next unexamined linked list, if the nodes in the current linked list have completed classification). If, in step 440, there are no more memory pages left to update, memory page classification module 138 returns to steps 400 and 410, waiting for the next elapse of the scanning time interval.

Figure 5:
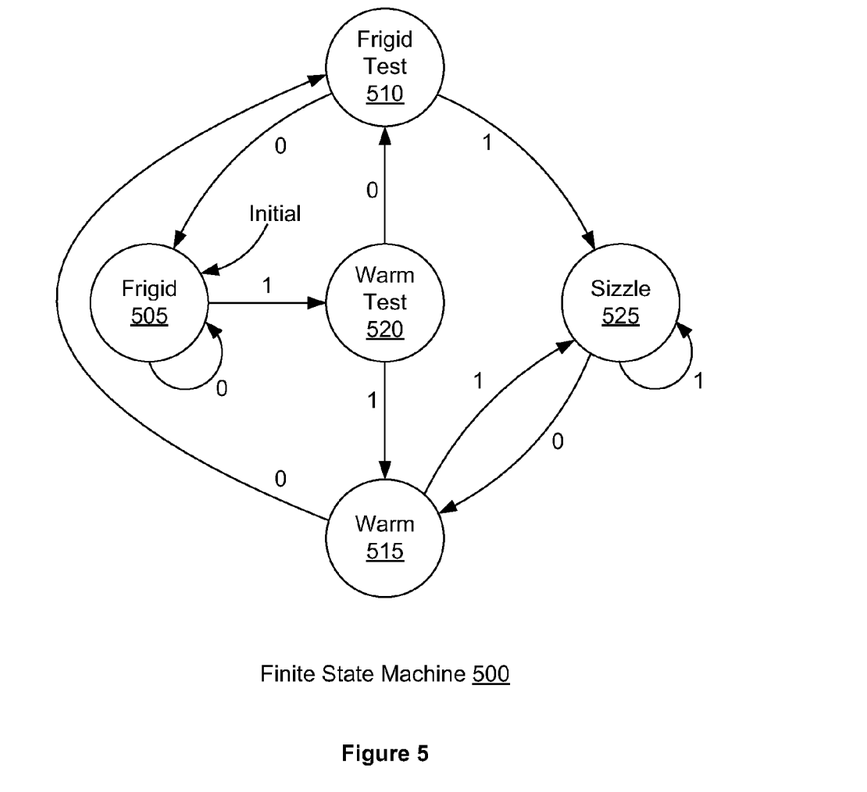
FIG. 5 depicts a base finite state machine for classifying memory pages of a VM for a base minimum scanning time interval.

As indicated by the flow diagram of FIG. 4, memory page classification module 138 includes logic implementing finite state machines to determine heat states for memory pages. FIG. 5 depicts a base finite state machine for classifying memory pages of a VM for a base minimum scanning time interval. Consistent with the states supported in the data structures of FIG. 3, FSM 500 includes 5 states: frigid state 505, frigid test state 510, warm state 515, warm test state 520, and sizzle state 525. When FSM 500 is utilized to determine heat state of memory pages for the base minimum scanning time interval, state transitions are determined based on input data of either "0" or "1" that is derived from the A/D bits of the page table entry for the corresponding memory page. For example, the D bit defines the input data in embodiments where heat state should be assessed based upon whether the memory page has been modified (e.g., such as for live migration of VMs, etc.). If the D bit is clear, then the input data is "0" indicating that the memory page has not been modified and if D bit is set, then the input data is "1" indicating that the memory page has been modified. However, it should be recognized that in other embodiments, the input data may correspond to either the A bit or the D bit, depending on whether the classification process should distinguish between read and write accesses to the memory page. A state transition arc from each state for each input data of "0" or "1" is shown. For example, in frigid state 505, an input data of "0" results in the FSM transitioning back to frigid state 505, while a input data of "1" results in the FSM transitioning to warm test state 520. In FSM 500, sizzle state 525 is reached from either three successive input data values of "1" being sampled in a row {1,1,1}, or an input data value of "1" being sampled followed by a "0" followed by another "1" {1,0,1}. Once the FSM 500 is in sizzle state 525, any "0" subsequently encountered will cause the FSM 500 to transition to warm state 515. However, a subsequent "1" will cause a transition back to sizzle state 525. As shown, frigid state 505 is the initial state for a memory page according to FSM 500. Sizzle state 525 represents a maximum page heat (hot), while frigid state 505 represents a minimum page heat (cold). Intermediate heat levels are represented by state warm 515, state warm test 520, and state frigid test 510. It should be recognized that FSM 500 is merely exemplary and that any other alternative FSM with any number of heat states and transition arcs based upon A/D bits and the like may be implemented consistent with the teachings herein.

Figure 6A:
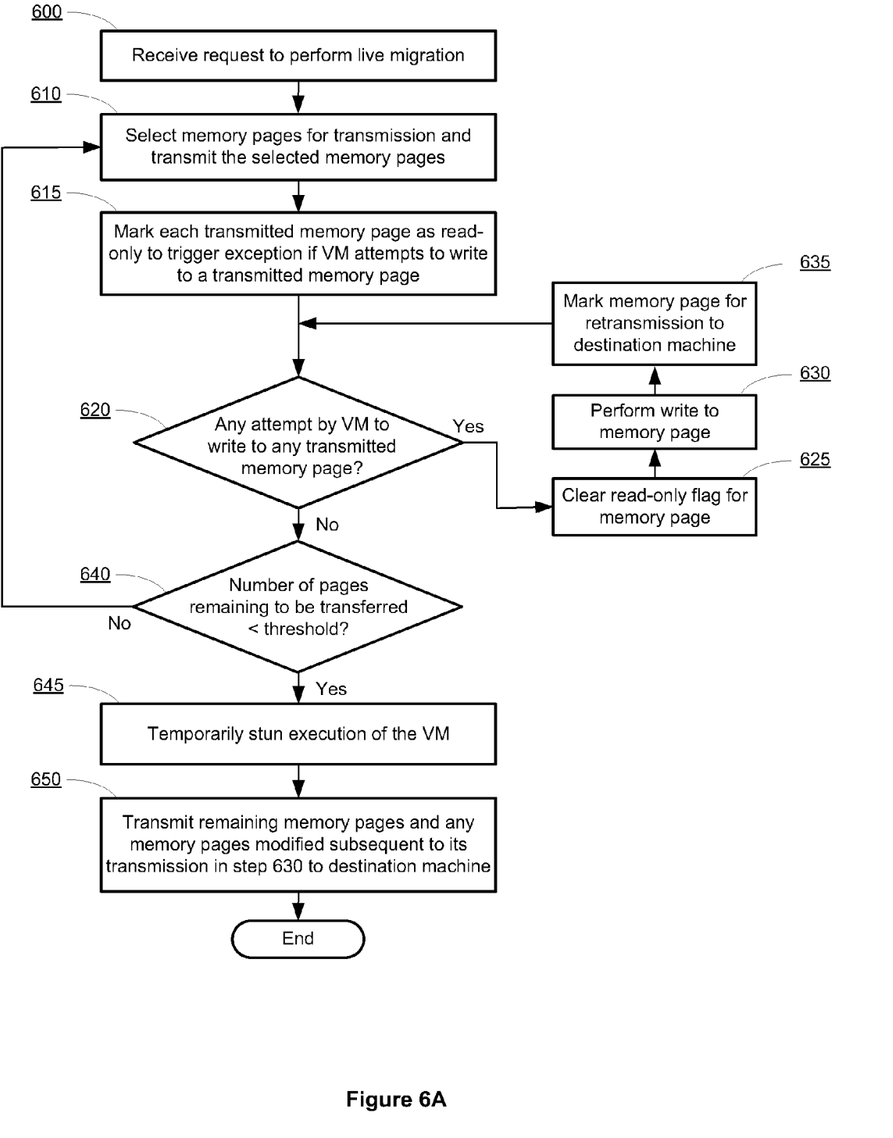
FIG. 6A depicts a flow diagram for performing live migration of a VM from a source machine to a destination machine.

FIG. 6A depicts a flow diagram for performing live migration of a VM from a source machine to a destination machine. In the example described herein, memory pages of the VM are continuously being classified into one of a plurality of heat classification states as described above in conjunction with FIG. 4. In step 600, hypervisor 118 receives a request (e.g., from an IT administrator) to perform live migration of the VM from a source machine to a destination machine. In step 610, while the VM is still executing, hypervisor 118 selects memory pages of the VM for transmission to the destination machine and transmits the selected memory pages of the VM to the destination machine. During the first pass through this loop (steps 610, 615, 620, and 640), only the memory pages classified as frigid are selected for transmission. During the second pass, out of the remaining memory pages to be transmitted, the memory pages classified as frigid, frigid test, and warm test are selected for transmission. During the third and subsequent passes, all of the remaining memory pages to be transmitted are selected for transmission. It should be understood that the heat classification criteria for selecting memory pages to be transmitted during any particular pass through the loop may be varied in alternative embodiments. In step 615, for each memory page transmitted in step 610 to the destination machine, hypervisor 118 flags its corresponding page table entry as read-only, such that, in step 620, if there is any attempt by the VM to write to any memory page that has been transmitted to the destination machine, an exception will fault control to hypervisor 118 and then in step 625, hypervisor 118 will clear the read-only flag in the memory page's page table entry, perform the requested write to the memory page in step 630, and, in step 635, mark the memory page for retransmission to the destination machine (i.e., since the memory page has now been modified since its prior transmission).

In step 640, hypervisor 118 assesses whether the number of memory pages to be transferred are less than a threshold number of memory pages. For example, in one embodiment, the threshold number of memory pages is based upon a number of memory pages that can be transmitted within a tolerable amount of time for keeping the VM stunned without significant loss of service from the VM. It should be recognized, however, that any number of similar methods may be utilized to determine a threshold number of remaining memory pages. If the number of memory pages to be transferred remains too high, then hypervisor 118 returns to step 610 for another pass through this loop. It should further be recognized that, in the meantime, memory page classification module 138 may be re-classifying the heat classification states of the remaining memory pages. The loop defined by steps 610, 615, 620, and 640 will continue for subsequent rounds until the remaining pages left to transfer are less than the threshold number. In step 645, hypervisor 118 then stuns the VM and in step 650, transmits to the destination machine all remaining un-transmitted memory pages and re-transmits all prior transmitted memory pages that were modified in step 630.

Figure 6B:
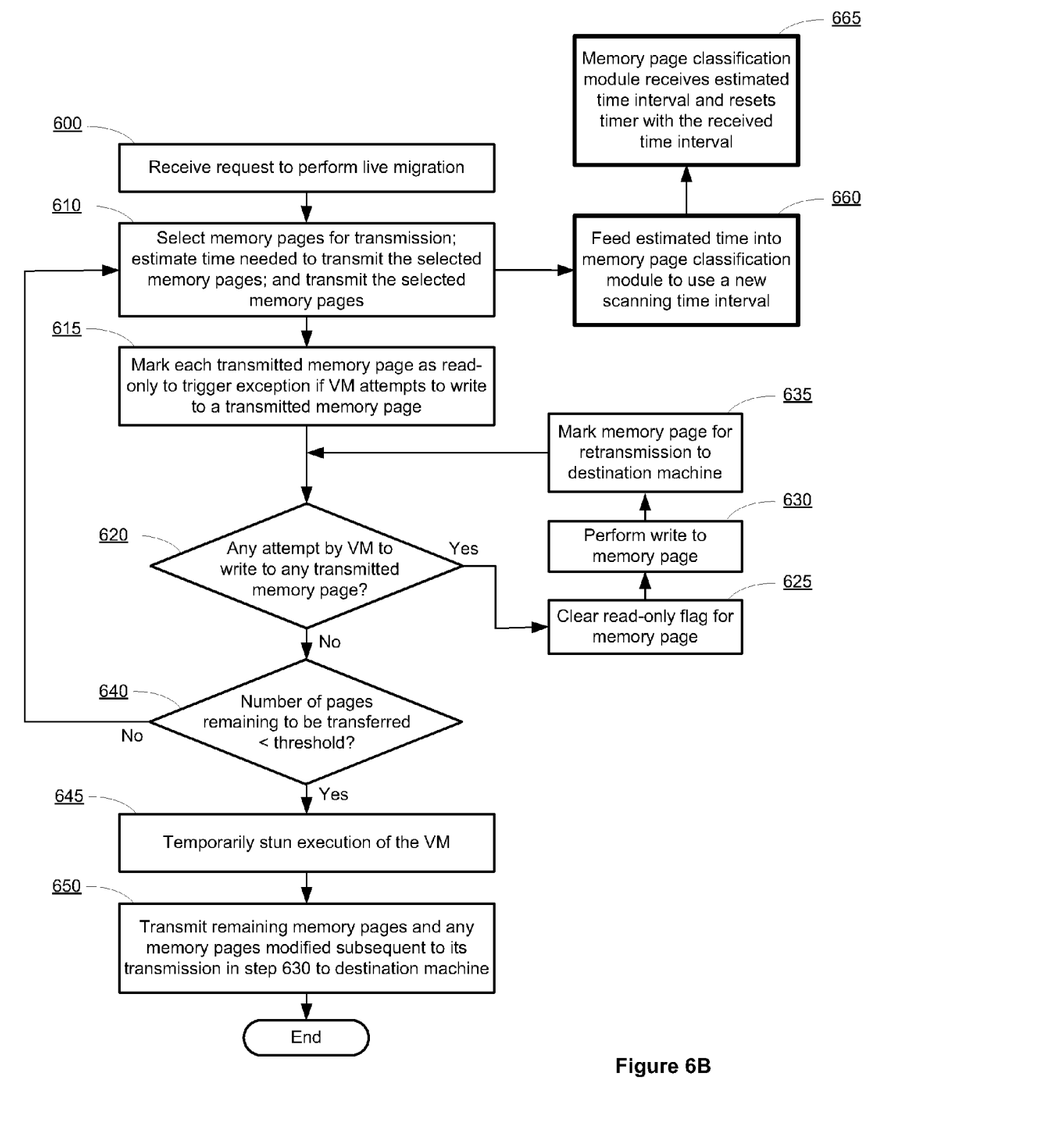
FIG. 6B depicts a flow diagram for performing live migration of a VM from a source machine to a destination machine utilizing a dynamically adjustable scan rate.

To align performance of memory page classification module 138 with the progress of live migration of the VM, one embodiment dynamically adjusts the scanning time interval utilized by memory page classification module 138 according to the progress of the live migration. For example, if the default scanning time interval of memory page classification module 138 is set to be 15 seconds and hypervisor 118 determines that a current set of memory pages to be transmitted to the destination machine can be transmitted within 5 seconds, then it is desirable for memory page classification module 138 to update its heat classification state data structures after a time interval of 5 seconds so that any subsequent rounds of memory page transmissions performed by hypervisor 118 may benefit from updated classification state for the memory pages (as opposed to utilizing classification states that may be stale and less accurate because the default scanning time interval is too long). FIG. 6B depicts a flow diagram for performing live migration of a VM from a source machine to a destination machine utilizing such a dynamically adjustable scan rate. FIG. 6B adds steps 660 and 665 to the flow diagram of FIG. 6A and, in step 610, hypervisor 118 estimates the time needed to transmit the selected memory pages to the destination machine given the current network bandwidth of the source machine. For example, during the first pass through this loop (steps 610, 615, 620, and 640), hypervisor 118 estimates the time needed to transmit all of the memory pages that are classified as frigid; during the second pass, hypervisor 118 estimates the time needed to transmit all of the memory pages that are classified as frigid, frigid test, and warm test out of the remaining memory pages to be transmitted; and during the third and subsequent passes, hypervisor 118 estimates the time needed to transmit all of the remaining memory pages to be transmitted. In step 660, hypervisor 118 feeds the estimated time into memory page classification module 138 to use as a new scanning time interval. In step 665, memory page classification module 138 receives the estimated time and resets its timer to the new received estimated time (i.e., the next update of classification state performed by memory page classification 138 will be performed after the estimated time interval). As such, the scanning time interval utilized by memory page classification module 138 is continually and dynamically updated by hypervisor 118 to more closely align with the time intervals for the rounds of "pre-stunned" memory page transmission during live migration such that step 610 is able to access updated heat classification states when it selects memory pages to transmit. It should be recognized that FIG. 6B is merely exemplary and that alternative embodiments may estimate or otherwise determine time intervals to be provided to memory page classification module 138 in a variety of other ways consistent with the teachings herein.

The method of dynamically adjusting scanning time intervals in the manner described above in the case of live migration of VMs has various other applications, including NUMA (Non-Uniform Memory Access) page migration after a set of memory pages to be migrated has been identified, and resuming a VM from a checkpoint that is stored on a mass storage device. The case of NUMA page migration is similar to the case of live migration of VMs. The only difference is that the data transfer speed that is relevant for adjusting the scanning time intervals is between NUMA nodes, whereas it is between hosts in the live migration case. In the case of resuming a VM from a checkpoint that is stored on a mass storage device, the speed of the mass storage device may also need to be considered when adjusting the scanning time intervals because the speed of the mass storage device may be slow or just as slow relative to the data transfer speed between the host and the mass storage device.

Although embodiments of the present invention have been described as being applied in a virtual machine environment with hypervisor-managed page tables, the techniques described herein are also applicable to operating systems that employ page tables to manage virtual memory to physical memory page mappings. Furthermore, the techniques taught herein may also be implemented in hardware, such as microcode in a microcode-driven processor, or directly implemented in logic circuits within a processor or processor support device.

It should be recognized that various modifications and changes may be made to the specific embodiments described herein without departing from the broader spirit and scope of the invention as set forth in the appended claims.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for migrating memory pages of a virtual machine from a source machine to a destination machine, the method comprising:
    repeatedly classifying an activity level of each memory page of the virtual machine at a specified time interval during execution of the virtual machine;
    identifying a first set of memory pages to be transmitted to the destination machine based on the activity level of the memory pages of the virtual machine;
    dynamically adjusting the specified time interval based on an estimated time interval of transmitting the identified first set of memory pages to the destination machine;
    transmitting the first set of memory pages from the source machine to the destination machine while the virtual machine is executing; and
    analyzing a remaining set of memory pages for additional memory pages to be transmitted to the destination machine based on the specified time interval, wherein the activity level of the remaining set of memory pages is updated during the specified time interval and by an end of the estimated time interval of transmitting.

2. The method of claim 1, further comprising:
    adjusting the specified time interval to be the estimated time interval.

3. The method of claim 1, wherein said estimating comprises:
    computing a time required to transit the number of memory pages in the first set to the destination machine based on a current network bandwidth.

4. The method of claim 1, wherein the activity levels comprise a high level, a low level, and at least one intermediate level between the high level and the low level.

5. The method of claim 4, wherein the memory pages in the first set comprise memory pages having the low level.

6. The method of claim 1, further comprising:
    determining that the number of memory pages in the remaining set is less than a threshold number; and
    stunning the virtual machine and transmitting the remaining set of memory pages to the destination machine.

7. The method of claim 1, further comprising:
    determining that the number of memory pages in the remaining set is not less than a threshold number; and
    identifying a second set of memory pages to be transmitted to the destination machine based on the activity level of the memory pages of the virtual machine.

8. A computer system including one or more virtual machines running therein and a hypervisor configured to migrate memory pages of a virtual machine from a source machine to a destination machine by performing the steps of:

repeatedly classifying an activity level of each memory page of the virtual machine at a specified time interval during execution of the virtual machine;

identifying a first set of memory pages to be transmitted to the destination machine based on the activity level of the memory pages of the virtual machine;

dynamically adjusting the specified time interval based on an estimated time interval of transmitting the identified first set of memory pages to the destination machine;

transmitting the first set of memory pages from the source machine to the destination machine while the virtual machine is executing; and     analyzing a remaining set of memory pages for additional memory pages to be transmitted to the destination machine based on the specified time interval, wherein the activity level of the remaining set of memory pages is updated during the specified time interval and by an end of the estimated time interval of transmitting.

9. The computer system of claim 8, wherein the hypervisor is further configured to perform the steps of:

adjusting the specified time interval to be the estimated time interval.

10. The computer system of claim 9, wherein the activity levels comprise a high level, a low level, and at least one intermediate level between the high level and the low level.

11. The computer system of claim 10, wherein the memory pages in the first set comprise memory pages having the low level.

12. The computer system of claim 8, wherein said step of estimating comprises:

computing a time required to transit the number of memory pages in the first set to the destination machine based on a current network bandwidth.

13. The computer system of claim 8, wherein the hypervisor is further configured to perform the steps of:

determining that the number of memory pages in the remaining set is less than a threshold number; and     stunning the virtual machine and transmitting the remaining set of memory pages to the destination machine.

14. The computer system of claim 8, wherein the hypervisor is further configured to perform the steps of:

determining that the number of memory pages in the remaining set is not less than a threshold number; and     identifying a second set of memory pages to be transmitted to the destination machine based on the activity level of the memory pages of the virtual machine.

15. A non-transitory computer-readable storage medium including instructions that, when executed by a computer processor, causes the computer processor to migrate memory pages of a virtual machine from a source machine to a destination machine by performing the steps of:

repeatedly classifying an activity level of each memory page of the virtual machine at a specified time interval during execution of the virtual machine;

identifying a first set of memory pages to be transmitted to the destination machine based on the activity level of the memory pages of the virtual machine;

dynamically adjusting the specified time interval based on an estimated time interval of transmitting the identified first set of memory pages to the destination machine;

transmitting the first set of memory pages from the source machine to the destination machine while the virtual machine is executing; and     analyzing a remaining set of memory pages for additional memory pages to be transmitted to the destination machine based on the specified time interval, wherein the activity level of the remaining set of memory pages is updated during the specified time interval and by an end of the estimated time interval of transmitting.

16. The non-transitory computer-readable storage medium of claim 15, wherein the instructions further causes the computer processor to perform the steps of:

adjusting the specified time interval to be the estimated time interval.

17. The non-transitory computer-readable storage medium of claim 16, wherein the activity levels comprise a high level, a low level, and at least one intermediate level between the high level and the low level.

18. The non-transitory computer-readable storage medium of claim 17, wherein the memory pages in the first set comprise memory pages having the low level.

19. The non-transitory computer-readable storage medium of claim 15, wherein said step of estimating comprises:

computing a time required to transit the number of memory pages in the current set to the destination machine based on a current network bandwidth.

20. The non-transitory computer-readable storage medium of claim 15, wherein the instructions further causes the computer processor to perform the steps of:

comparing the number of memory pages in the remaining set with a threshold number; and     if the number of memory pages in the remaining set is less than the threshold number, stunning the virtual machine and transmitting the remaining set of memory pages to the destination machine, and if the number of memory pages in the remaining set is not less than the threshold number, identifying a second set of memory pages to be transmitted to the destination machine based on the activity level of the memory pages of the virtual machine.

\* \* \* \* \*